No. 871,876. PATENTED NOV. 26, 1907.
P. E. LAW.
LAVATORY.
APPLICATION FILED MAR. 13, 1907.
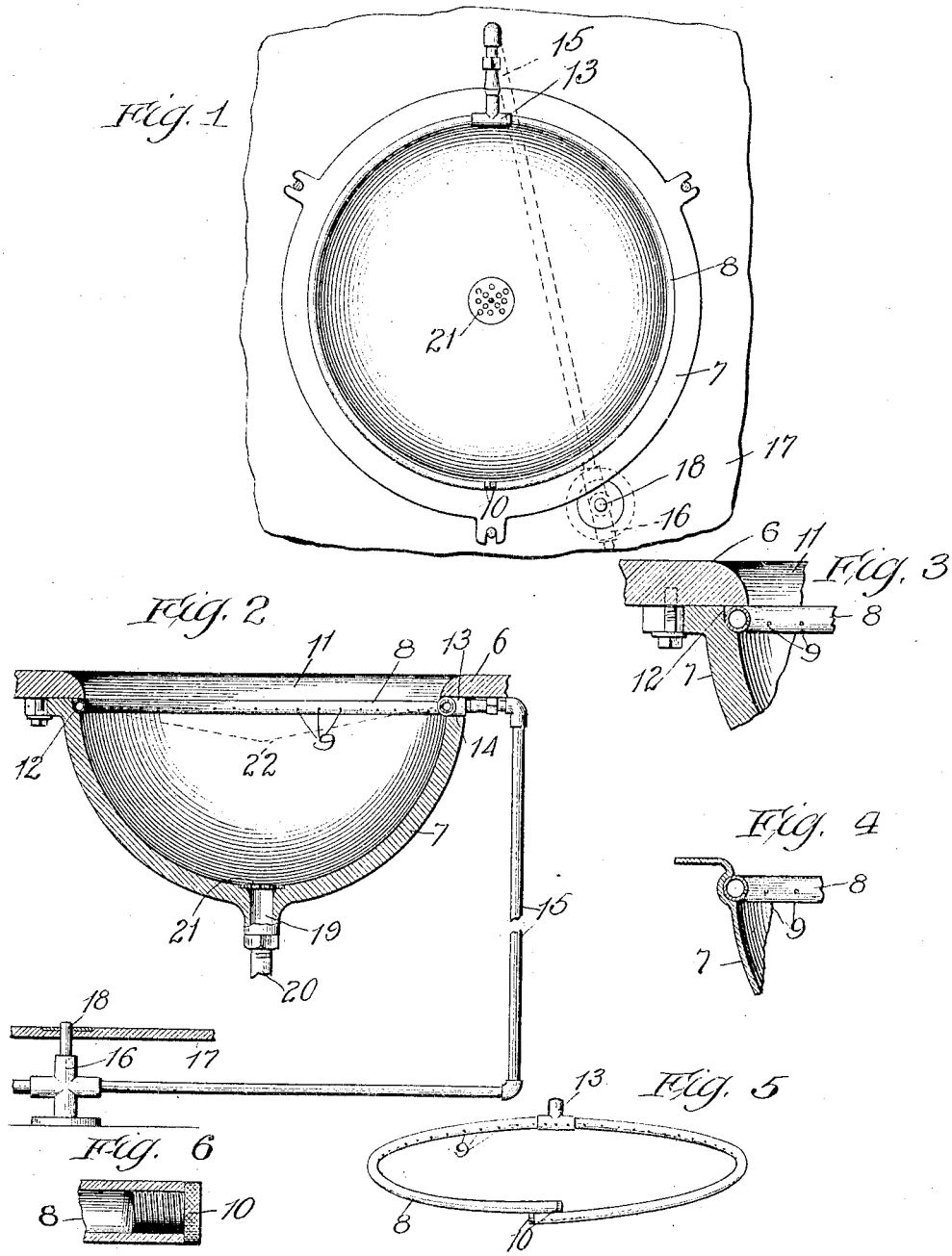

UNITED STATES PATENT OFFICE.

PRENTIS E. LAW, OF WILMETTE, ILLINOIS.

LAVATORY.

No. 871,876.   Specification of Letters Patent.   Patented Nov. 26, 1907.

Application filed March 18, 1907. Serial No. 362,827.

*To all whom it may concern:*

Be it known that I, PRENTIS E. LAW, a citizen of the United States, residing at Wilmette, in the county of Cook and State of Illinois, have invented new and useful Improvements in Lavatories, of which the following is a specification.

This invention relates to lavatories and is particularly designed for embodiment in lavatories located in hotels and other public places which are used principally for washing the hands.

The object of the invention is to provide for discharging the water centrally in the bowl in a spray so that the hands can be washed in fresh water constantly changing without contact with the bowl.

Another object of the invention is to provide a spraying ring adapted to be readily inserted in the bowl to discharge the water centrally therein and constructed to permit of its being easily and quickly cleaned.

In the accompanying drawings I have illustrated one embodiment of the invention in which the water supply is controlled by a foot operated valve and referring thereto Figure 1 is a top plan view of a lavatory embodying the invention, showing the slab broken away. Fig. 2 is a sectional elevation. Fig. 3 is an enlarged detail sectional view. Fig. 4 is a similar view showing the manner of embodying the invention in a metal bowl. Fig. 5 is a perspective view of the spraying ring. Fig. 6 is a detail sectional view showing the plug at one end of the ring.

Referring to the drawings 6 is the slab and 7 the bowl of an ordinary lavatory. A tubular divided ring 8 is provided with a plurality of openings 9 and its ends overlap and are closed by removable screw-threaded plugs 10. The ring is constructed to fit snugly in the bowl beneath the edge of the slab surrounding the opening 11 therein and I prefer to provide the bowl interiorly with a recess or groove 12 at its upper edge to receive the ring. The ring has a tee 13 which extends through an opening 14 in the bowl and connects with a supply pipe 15. The supply pipe is carried upward beneath the bowl and is provided with a valve 16 beneath the floor 17 and constructed to be operated by a plunger 18 projecting upward through the floor. The bowl has an outlet opening 19 leading to a drain pipe 20 and a perforated cover 21 may be arranged in the bowl over the opening 19.

It will be observed that the ring can be readily inserted in the bowl because, being divided, it can be compressed to a smaller diameter than the upper edge of the bowl and after being arranged in place the ring can be expanded to fit throughout its length in the recess or groove with its ends abutting. The openings 9 are located at the inner side of the ring and preferably below the horizontal diameter thereof so that the spray of water discharged from the openings will be directed inward centrally of the bowl and slightly downward as indicated by the dotted line 22 in Fig. 2. Thus the spray is concentrated at the center of the bowl so that the hands can be washed in the spray without contact with the bowl and without causing the water to splash out of the bowl.

My invention promotes the sanitary condition of lavatories by avoiding the usual custom of washing the hands in a bowlful of still water which, when the drain is opened, flows out but leaves a dirty deposit on the inner face of the bowl. With my invention the dirt and soap removed from the hands are carried away instantly in the spray of running water leaving the bowl clean. The spray of water by its action materially facilitates and improves the cleansing operation and also imparts a refreshing and pleasing sensation.

My invention avoids the necessity for the use of bibbs and faucets and thereby greatly reduces the expense of installing and maintaining lavatories, particularly in public places where they are subject to rough usage. My invention produces a saving in the amount of water used because not as much is required as in the ordinary lavatories.

Whatever sediment is not carried by the water through the openings in the ring will accumulate in the ring below the level of the openings and by pulling the ends of the ring out of the recess and removing the plugs, this sediment can be ejected from the ring by the water flowing therethrough.

What I claim and desire to secure by Letters Patent is:

The combination with a lavatory bowl having an opening in its side, of a tubular ring arranged within the bowl at the top thereof and provided with openings located on the inner side of the ring to direct jets of water in the form of a spray centrally of the bowl and from the entire length of the ring, said ring being divided, plugs removably secured in the ends of said ring to abut one against the other when the ring is arranged in the bowl, there being a tee in the ring opposite said plugs to enter the opening in the bowl, a supply pipe connected to said tee, and a foot operated valve located in said supply pipe below the bowl and in convenient position for operation by a person using the bowl.

PRENTIS E. LAW.

Witnesses:
 WM. O. BELT,
 M. A. KIDDIE.